No. 3,007,980
REMOVAL OF IMPURITIES FROM VOLATILE LIQUIDS
Paul D. Barton, Phoenixville, and Charles H. Brooks, Swarthmore, Pa., assignors to Sun Oil Company, Philadelphia, Pa., a corporation of New Jersey
Filed June 20, 1958, Ser. No. 743,297
8 Claims. (Cl. 260—676)

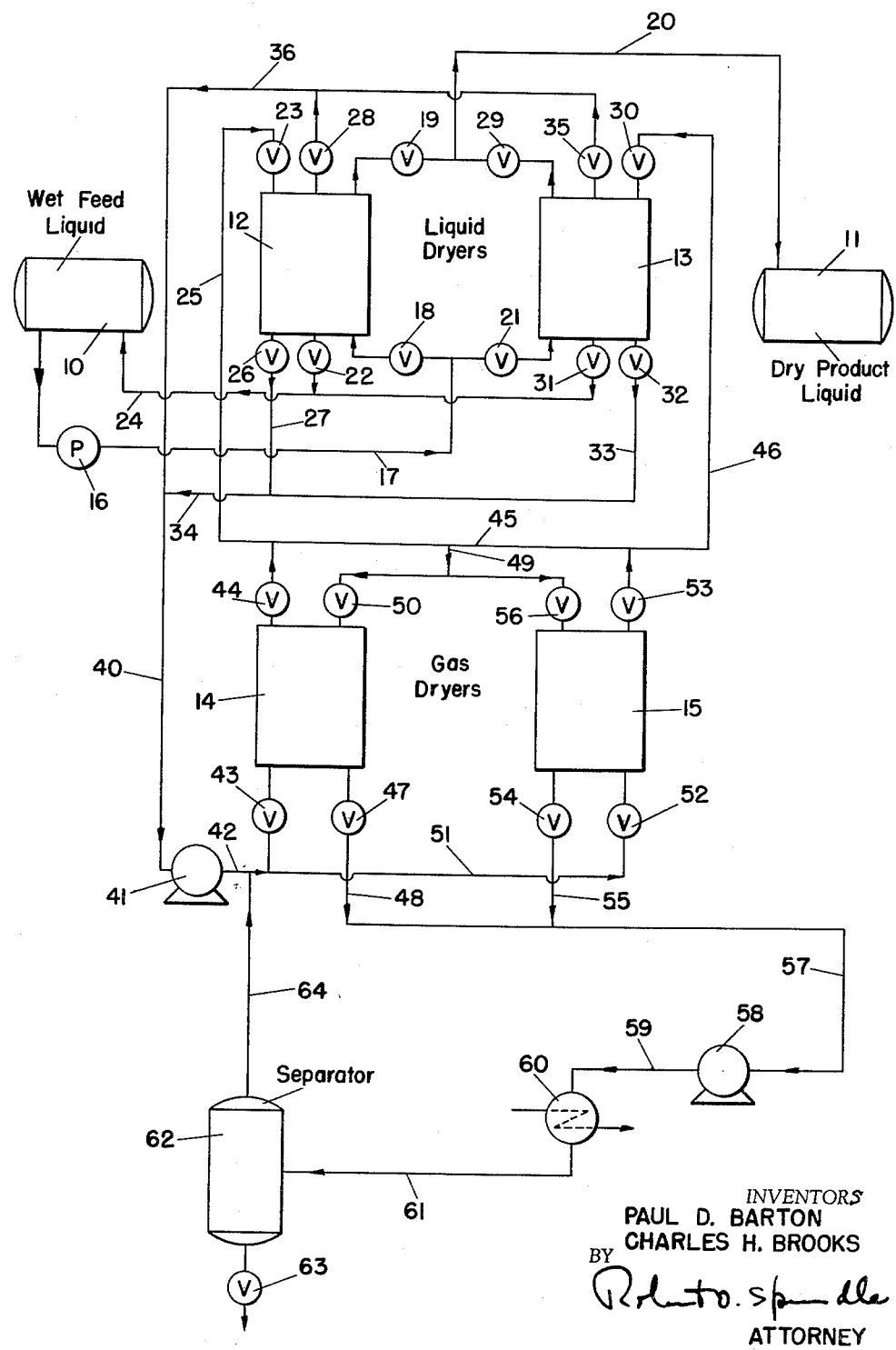

This invention relates to a method and means for removing a volatile liquid a constituent present in small amount as an impurity. More particularly the invention is directed to a method and system for removing such impurity from a volatile liquid by means of an adsorbent in a cyclic operation wherein no heat is required for regenerating the adsorbent.

In one specific embodiment of the invention a volatile liquid, such as a relatively low boiling hydrocarbon, is continuously dehydrated by means of a suitable adsorbent disposed in a plurality of zones to which the liquid is fed alternately in a cyclic operation. While one of the zones is being used to effect dehydration of the liquid, one or more of the other zones operates in a regenerating part of the cycle during which moisture is removed from the adsorbent without any heat being supplied to the system.

There are numerous instances in commercial practice where it is desired to remove from a volatile liquid a constituent present in small amount as an impurity. Often an adsorbent which will selectively remove the impurity is used for this purpose. For successful operation it is necessary periodically to regenerate the adsorbent for further use. This is customarily done by heating the adsorbent, usually by blowing it with steam or other hot inert gas, to drive off the adsorbed material. The adsorbent then is cooled prior to re-use. In conventional operations of this kind suitable means are required for supplying heat to the system and for cooling the adsorbent after it has been regenerated. The requisite fuel requirements and the equipment that must be provided for heating and cooling add to the costs of the operation.

The present invention provides a system in which impurities can be continuously removed from volatile liquids without any provision for supplying heat to the system. The system is thus particularly useful in isolated locations where fuel may not be available. The method of the invention is applicable to the treatment of numerous volatile liquids containing impurities which can be selectively adsorbed by means of a suitable adsorbent. A particularly useful application of the invention is the dehydration of hydrocarbons, such as propane, butane, pentanes, hexanes, petroleum spirits and the like, utilizing an adsorbent such as silica gel or activated alumina. Another application is the separation of olefinic impurities from hydrocarbons, for example, the separation of minor amounts of butenes or butadiene from butane or the separation of small amounts of benzene from a petroleum fraction, by means of silica gel, activated alumina or activated carbon. The invention can also be applied to the removal of polar compounds, such as sulfur, nitrogen and oxygen compounds, from naphthas or other volatile hydrocarbon fractions utilizing a suitable adsorbent such as bauxite or adsorptive clays.

In accordance with the invention a volatile liquid is treated in a cyclic operation utilizing two or more treating zones containing an adsorbent which will selectively adsorb the impurity present in the liquid. The charge liquid is fed under a pressure at least as high as its vapor pressure alternately to the treating zones, being passed through each zone for a relatively short time. While the liquid is being introduced to one zone, one or more of the other zones is in a regeneration phase of the cycle. The regeneration is carried out by emptying the remaining liquid from the zone and then passing an unheated inert gas at relatively low pressure through it to remove the adsorbate. This also is done for a relatively shot time during each cycle. The effluent gas containing the impurity is compressed to a relatively high pressure and is fed alternately to two or more gas treating zones containing an adsorbent. Under the high pressure the impurity is effectively removed from the gas by the adsorbent. The exit gas is recycled to the liquid treating zones, without being heated, to effect alternate regeneration of the adsorbent therein. After each gas treating zone has been used in this manner for a short time, it then is operated for regeneration of the contained adsorbent. This is done by reducing the pressure in the zone and passing a portion of the previously treated gas through the zone at relatively low pressure and without heating. Under the relatively low pressure prevailing at this stage of the operation, a minor amount of the total gas cycled in the system is capable of removing the adsorbed impurity from the gas treating zone. The effluent gas containing the impurity is then compressed and the heat resulting from compression is removed by cooling. The cooled gas is passed to a vapor-liquid separator where the liquid is removed. Such liquid is composed of the impurity and any of the volatile charge liquid which has been carried through the system. Gas from the separator is returned to the gas treating zones for passage therethrough a relatively high pressure in admixture with the gas from the liquid treating zones.

In the foregoing description the term "volatile liquid" is intended to mean one which has sufficient volatility that any of it which has remained on the adsorbent in the liquid treating zones at the time regeneration is begun will readily evaporate therefrom into the gas phase. If the charge liquid is too high boiling, that which is present on the surfaces of the adsorbent as the gas is passed at low pressure through the zone will trap the impurity and prevent its removal. Liquids which normally boil below 400° F. have sufficient volatility for successful treatment by the present process. The impurity to be removed also should boil within or below the boiling range of the charge, as normally would be the case, so that the impurity will have sufficient volatility for removal from the adsorbent by the low pressure gas.

The effectiveness of the above-described procedure depends upon the change which occurs in the carrying capacity of the inert gas for a volatile impurity as the pressure changes. It is characteristic of such gas that, when it is in equilibrium with an adsorbent, it can contain a relatively high concentration of a volatile constituent when the gas pressure is low but only a relatively low concentration when the pressure is high. Conversely, the adsorbent can retain only a relatively small amount of the material when gas at low pressure is passed through it but will retain a relatively large amount when the gas pressure is high. Consequently, by regenerating the adsorbent in the liquid treating zone with gas at a relatively low pressure, the impurity can readily be taken up by the gas phase; and the resulting gas can then be purified by increasing its pressure and contacting it with adsorbent at relatively high pressure in the gas treating zone. The difference between these pressures should be at least 25 p.s.i. and preferably in excess of 50 p.s.i. However, the gas pressure during regeneration of the adsorbent in the liquid treating zones should not be more than 25 p.s.i. lower than the vapor pressure of the feed liquid at the operating temperature employed and preferably should be about the same as such vapor pressure. This is important in order to avoid excessive cooling of the adsorbent by rapid evaporation of retained feed liquid.

The adsorbent used in the gas treating zone likewise can be regenerated by utilizing a portion of the previously treated gas but at relatively low pressure. The higher carrying capacity at the lower pressure used in purifying the gas, causes the impurity to be stripped from the adsorbent and thus regenerates it for re-use. Again the difference between the high and low pressures used in the gas treating zone should be at least 25 p.s.i. and preferable in excess of 50 p.s.i.

The effectiveness of the present process also depends on utilizing short time periods in each phase of the cyclic operation. In other words the duration of the purifying treatments for both the charge liquid and the used regeneration gas, and of the regeneration phases in both the liquid and gas treating zones, should be relatively short in each operation cycle. An important reason for employing short operating periods in each phase is to avoid substantial temperature variations in the adsorbent beds. When adsorption occurs the temperature in the bed rises due to release of the heat of adsorption. Contrariwise, when the adsorbed constituent is desorbed, a decrease in temperature occurs. It is desirable to minimize these temperature variations during the operation, and accordingly short operating times are employed. Generally, the times for each phase of operation should be in the range of 2–10 minutes and preferably 2–4 minutes.

A short on-stream time for the charge liquid causes the impurity to be retained essentially on the outer surfaces of the adsorbent and prevents it from penetrating substantially into the pores. When the adsorbent then is regenerated, the impurity can more readily and effectively be removed by the inert gas at low pressure, resulting in only a short regeneration time being required.

The invention is more specifically described in conjunction with the accompanying drawing which is a diagrammatic illustration of the system for carrying out the present process. Operation of the system illustrated in the drawing is described below with specific reference to the dehydration of a hydrocarbon such as liquefied propane.

The system illustrated in the drawing includes a wet liquefied propane feed tank 10, a dry propane product tank 11, propane drying vessels 12 and 13, and gas drying vessels 14 and 15. Each of the vessels 12, 13, 14 and 15 contains a bed of adsorbent consisting of 390 lbs. of silica gel. Wet liquid propane, having, for example, a moisture content of 200 p.p.m. and a temperature of 100° F., is fed from tank 10 through pump 16 and line 17 alternately to vessels 12 and 13 at a rate of 300 g.p.m. Sufficient pressure, such as 300 p.s.i.g., is maintained on the propane to keep it in liquid form. At one stage of the operation propane is fed through valve 18 into vessel 12, wherein it is contacted with the silica gel to adsorb moisture. The dried product containing, for example, 10 p.p.m. of water flows from the top of the vessel through valve 19 and line 20 to product tank 11. During this time vessel 13 is operating in a regeneration stage as hereinafter described.

After vessel 12 has been used for treating the propane for a short time such as 2 minutes, valves 18 and 19 are closed and the propane feed is diverted to vessel 13 by opening valve 21. Vessel 12 is then prepared for the regenerating stage of its cycle. This is done by opening drain valve 22 and inert gas inlet valve 23, thus causing retained propane to flow out of the vessel and pass through line 24 back to wet feed tank 10. During this preparation period, the pressure in vessel 12 should be maintained in excess of that in feed tank 10 so that the liquid in vessel 12 will flow to the feed tank. Valve 22 is of a known or suitable type which will remain open as long as liquid is flowing therein but which will close as soon as gas enters it. Accordingly, when the propane level reaches valve 22, the valve closes and vessel 12 is ready for its regenerating stage.

In regenerating the adsorbent, previously dried gas, which can be any inert gas such as methane, nitrogen, carbon dioxide, flue gas and the like, is admitted from line 25 through valve 23 into vessel 12 wherein it contacts the silica gel. Immediately upon closure of valve 22, valve 26 opens and moisture-containing gas passes through lines 27 and 34 to the gas drying units. By means of valves 23 and 26 the gas pressure during this regeneration stage is regulated and maintained at a pressure not more than 25 p.s.i. below the vapor pressure of propane at the operating temperature (about 100° F.) and preferably at a pressure approximately equivalent to such vapor pressure. This is done to avoid flash vaporization of propane retained in the adsorbent which would cause too rapid cooling of the adsorbent. By maintaining the gas pressure near the propane vapor pressure, evaporation of propane will occur more slowly and the heat of evaporation can be supplied largely by the gas flowing through vessel 12.

After regenerating the silica gel for a suitably short time such as 2 minutes, vessel 12 is then used again for treating the wet propane. Valve 26 is closed and the pressure in the vessel is allowed to rise, by continued admission of gas through valve 23, until it has reached the desired operating pressure for treating the propane. Valve 23 then is closed and valve 18 is opened again to admit wet propane to the vessel. Valve 28 at the top immediately is opened in order to vent the gas retained in the vessel through line 36, whence it returns to the gas drying units. Valve 28 is of a known or suitable type which remains open as long as gas is flowing therethrough but which closes when liquid reaches its. Accordingly, when the propane level rises to valve 28, it closes and valve 19 simultaneously opens to permit the dried propane to pass to product tank 11.

During the regeneration period for vessel 12, wet propane is treated in vessel 13 in the same manner as described for the other vessel. The wet propane passes through valve 21 into and through vessel 13 and the dry product flows through valve 29 and line 20 to product tank 11. Thereafter this vessel is emptied of retained propane by opening inert gas valve 30 and drain valve 31 from which the liquid flows through line 24 back to feed tank 10. When the vessel has been emptied of liquid, the drain valve closes and valve 32 opens so that the moisture-containing gas can pass via lines 33 and 34 to the gas drying units. A typical pressure for this regeneration likewise is not more than 25 p.s.i.g. lower than the vapor pressure of the propane. After a 2-minute regeneration period, valves 21 and 35 open, and wet propane is fed into vessel 13 while the gas therein is forced out through valve 35 whence it returns via line 36 to the gas drying units. When the liquid reaches valve 35, it closes and valve 29 opens for passage of the dried propane to product tank 11.

The gas streams which leave the propane driers are sent from lines 34 and 36 through line 40 to compressor 41 wherein the gas pressure is raised to a relatively high value, for example, 300 p.s.i.g. The compressed gas is fed through line 42 alternately to gas driers 14 and 15. At one stage in the operating cycle the gas passes through valve 43 into drier 14 wherein its moisture content is reduced by contact with the silica gel. The dried gas leaves the top of drier 14 through valve 44 which can serve as a pressure reducing valve, and from there the gas can pass when needed to propane drier 12 via line 25 or to propane drier 13 via gas manifold line 45 and line 46. A gas surge tank (not shown) can be connected to manifold line 45 if desired, although this is not essential for successful operation of the system. After the high pressure gas has been passed through drier 14 for a short time such as 2 minutes, the operation of this drier is then shifted to effect regeneration. This is done by closing valves 43 and 44 and opening valve 47 at the bottom of drier 14 to allow this vessel to vent down to a relatively low pressure, such as 25 p.s.i.g., through line 48. Gas from manifold line 45 is then sent through line 49 and valve 50 into drier 14 through which it is passed at relatively low pressure, such as 25 p.s.i.g., for a 2-minute period to remove water from the silica gel. Thereafter high pressure gas from compressor 41 is again fed into dried 14 into another operating cycle.

During the regeneration stage of drier 14, gas from compressor 41 is sent through line 51 and valve 52 into drier 15 at high pressure. The dried gas passes from this drier through valve 53 which can serve as a pressure reducing valve, and from there the gas can be recycled as needed through lines 45 and 25 to propane drier 12 or through line 46 to propane drier 13. After a 2-minute period valves 52 and 53 are closed, valve 54 is opened to vent down the vessel through line 55, and then gas at low pressure is sent from manifold line 45 through line 49 and valve 56 into drier 15 to remove water from the silica gel during a 2-minute regeneration period.

The low pressure gas resulting from regenerating driers 14 and 15 is passed through line 57 to another compressor 58 which raises the pressure back to about 300 p.s.i.g. The compressed gas then flows through line 59, through cooler 60 and line 61 to separator 62. Cooler 60 removes heat resulting from the compression step and allows water and also propane which has been carried through the system to condense. The resulting liquid separates from the gas in separator 62 from which it can be removed through valve 63. The gas is then recycled from the separator through line 64 to line 42 where it is admixed with wet gas obtained from the propane driers.

In the above-described system valves 22, 28, 31 and 35 are actuated by a change in the fluid phase passing therethrough as previously described. The other valves which are used to operate the propane and gas driers preferably should be motorized valves operated from a cycle timer so that the various operating phases of the driers can be properly correlated and effectively controlled. Suitable cycle timing devices are well known in the art and need not be described herein. Provision should be made, of course, for supplying inert gas to the system at any convenient point as required. While in the accompanying drawing only two driers are shown for treating the propane feed and two for treating the moisture-containing gas, these are only illustrative and it is to be understood that any suitable number of drying vessels can be used in each part of the system.

We claim:

1. Method of removing a volatile impurity from a volatile liquid in a cyclic operation utilizing a plurality of liquid purifying zones containing an adsorbent which will selectively adsorb said impurity, which comprises passing said liquid under a pressure at least as high as its vapor pressure alternately through said zones to adsorb said impurity therefrom, alternately regenerating the adsorbent in said zones by passing therethrough hereinafter specified gas in unheated condition to remove the impurity from the adsorbent, the pressure of the gas in said zones during regeneration being at least 25 p.s.i. below the hereinafter specified relatively high pressure but not more than 25 p.s.i. below the vapor pressure of said liquid, passing the resulting impurity-containing gas at relatively high pressure alternately through a plurality of gas purifying zones containing adsorbent to remove the impurity therefrom and thereby produce gas for use as said specified gas in the liquid purifying zones, periodically and alternately regenerating adsorbent in said gas purifying zones by passing a portion of said specified gas therethrough at relatively low pressure, compressing and cooling the resulting impurity-containing gas, separating liquid from the compressed and cooled gas, and returning such gas to said gas purifying zones for passage therethrough at relatively high pressure in admixture with the gas from the liquid purifying zones, each phase of operation for both the liquid purifying zones and the gas purifying zones being conducted for a time of 2–10 minutes.

2. Method according to claim 1 wherein the difference between said high and low pressures is at least 50 p.s.i. and said time is 2–4 minutes.

3. Method of dehydrating a volatile liquid in a cyclic operation utilizing a plurality of liquid dehydrating zones containing a dehydrating adsorbent, which comprises passing said liquid under a pressure at least as high as its vapor pressure alternately through said zones to adsorb water therefrom, alternately regenerating the adsorbent in said zones by passing therethrough an unheated, previously dried gas to remove water from the adsorbent, the pressure of the gas in said zones during regeneration being at least 25 p.s.i. below the hereinafter specified relatively high pressure but not more than 25 p.s.i. below the vapor pressure of said liquid, passing the resulting water-containing gas at relatively high pressure alternately through a plurality of gas dehydrating zones containing dehydrating adsorbent to dry the same and thereby produce dried gas for use in regenerating adsorbent in said liquid dehydrating zones, periodically and alternately regenerating adsorbent in said gas dehydrating zones by passing a portion of said dried gas therethrough at relatively low pressure, compressing and cooling the resulting water-containing gas, separating liquid from the compressed and cooled gas, and returning such gas to said gas dehydrating zones for passage therethrough at said relatively high pressure in admixture with said water-containing gas from the liquid dehydrating zones, each phase of operation for both the liquid dehydrating zones and the gas purifying zones being conducted for a time of 2–10 minutes.

4. Method according to claim 3 wherein the difference between said high and low pressures is at least 50 p.s.i. and said time is 2.4 minutes.

5. Method of dehydrating a relatively low boiling hydrocarbon in a cyclic operation utilizing a plurality of hydrocarbon dehydrating zones containing a dehydrating adsorbent, which comprises passing said hydrocarbon under a pressure at least as high as its vapor pressure alternately through said zones to adsorb water therefrom, alternately regenerating the adsorbent in said zones by passing therethrough an unheated, previously dried gas to remove water from the adsorbent, the pressure of the gas in said zones during regeneration being at least 25 p.s.i. below the hereinafter specified relatively high pressure but not more than 25 p.s.i. below the vapor pressure of said hydrocarbon, passing the resulting water-containing gas at relatively high pressure alternately through a plurality of gas dehydrating zones containing dehydrating adsorbent to dry the same and thereby produce dried gas for use in regenerating adsorbent in said hydrocarbon dehydrating zones, periodically and alternately regenerating adsorbent in said gas dehydrating zones by passing a portion of said dried gas therethrough at relatively low pressure, compressing and cooling the resulting water-containing gas, separating liquid from the compressed and cooled gas, and returning such gas to said gas dehydrating zones for passage therethrough at said relatively high pressure in admixture with said water-containing gas from the hydrocarbon dehydrating zones, each phase of operation for both the hydrocarbon dehydrating zones and the gas purifying zones being conducted for a time of 2–10 minutes.

6. Method according to claim 5 wherein the difference between said high and low pressures is at least 50 p.s.i and said time is 2–4 minutes.

7. Method according to claim 6 wherein said relatively low boiling hydrocarbon is propane.

8. A system comprising (a) a plurality of liquid chambers, (b) a plurality of gas chambers, (c) means for alternately feeding the charge material into said liquid chambers, (d) means for alternately removing liquid from said liquid chambers, (e) means for alternately feeding gas withdrawn from said gas chambers into said liquid chambers, (f) means for alternately removing gas from said liquid chambers, (g) means for compressing the gas so removed from said liquid chambers, (h) means for alternately feeding said compressed gas into said gas chambers, (i) means for alternately introducing gas previously withdrawn from said gas chambers back thereinto, (j) means for alternately withdrawing such introduced gas from said gas chambers, (k) means for compressing the so withdrawn gas from said gas chambers, (l) means for cooling the compressed gas from said gas chambers, (m) a separator for removing liquid from the compressed gas from the gas chambers, and (n) means for alternately returning the compressed gas from the liquid separator to said gas chambers.

References Cited in the file of this patent

UNITED STATES PATENTS

| | | |
|---|---|---|
| 2,356,890 | Schulze | Aug. 29, 1944 |
| 2,628,933 | Eagle et al. | Feb. 17, 1953 |
| 2,818,137 | Richmond et al. | Dec. 31, 1957 |
| 2,859,256 | Hess et al. | Nov. 4, 1958 |
| 2,904,507 | Jahnig | Sept. 15, 1959 |
| 2,920,037 | Haensel | Jan. 5, 1960 |